(12) United States Patent
Vanous et al.

(10) Patent No.: US 12,528,331 B2
(45) Date of Patent: Jan. 20, 2026

(54) ELECTRICALLY ISOLATING HAZARDOUS VOLTAGE FROM VEHICLE POWERED TRANSPORT CLIMATE CONTROL SYSTEM

(71) Applicant: THERMO KING LLC, Minneapolis, MN (US)

(72) Inventors: Michael James Vanous, Minneapolis, MN (US); Ryan Wayne Schumacher, Bloomington, MN (US); Marcelo Andrade Dias, Lakeville, MN (US); Panayu Robert Srichai, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 213 days.

(21) Appl. No.: 18/353,310

(22) Filed: Jul. 17, 2023

(65) Prior Publication Data
US 2025/0026171 A1   Jan. 23, 2025

(51) Int. Cl.
*B60H 1/00* (2006.01)
*B60H 1/32* (2006.01)
(Continued)

(52) U.S. Cl.
CPC ..... *B60H 1/00428* (2013.01); *B60H 1/00364* (2013.01); *B60H 1/00371* (2013.01);
(Continued)

(58) Field of Classification Search
CPC ............ B60H 1/00428; B60H 1/00364; B60H 1/00371; B60H 1/00378; B60H 1/3222; B60H 1/00421; B60H 1/00435; B60H 1/32; B60H 1/3204; B60H 1/3229; B60H 1/3232; B60R 16/0238; B60R 16/0239;
(Continued)

(56) References Cited

U.S. PATENT DOCUMENTS

| 11,667,174 B2 | 6/2023 | Zaeri et al. |
| 2003/0000236 A1 | 1/2003 | Anderson et al. |

(Continued)

FOREIGN PATENT DOCUMENTS

| CA | 3172467 | 12/2022 |
| CN | 102666161 | 1/2015 |
| WO | 2005/108135 | 11/2005 |

OTHER PUBLICATIONS

Extended European Search Report, issued in the corresponding European patent application No. 24189274.4, dated Dec. 18, 2024, 8 pages.

*Primary Examiner* — Justin M Kratt
(74) *Attorney, Agent, or Firm* — HSML P.C.

(57) ABSTRACT

A transport climate control system configured to provide climate control within a climate controlled space towed by a vehicle is provided. The transport climate control system includes an electrical isolation box configured to house and a drive module and a compressor. The drive module receives power from a vehicle power network including a rechargeable energy storage system (RESS) to power the compressor. The drive module and the compressor are electrically isolated at a climate control system electrical potential reference, which is different from an electrical potential reference of a vehicle chassis to which the electrical isolation box is connected.

20 Claims, 7 Drawing Sheets

(51) Int. Cl.
  *B60R 16/02* (2006.01)
  *B60R 16/023* (2006.01)
  *B60R 16/03* (2006.01)
  *H02G 3/18* (2006.01)
  *B60P 3/20* (2006.01)
  *H02G 3/08* (2006.01)

(52) U.S. Cl.
  CPC ....... *B60H 1/00378* (2013.01); *B60H 1/3222* (2013.01); *B60R 16/02* (2013.01); *B60R 16/0238* (2013.01); *B60R 16/0239* (2013.01); *B60R 16/03* (2013.01); *H02G 3/18* (2013.01); *B60H 1/00421* (2013.01); *B60H 1/00435* (2013.01); *B60H 1/32* (2013.01); *B60H 1/3204* (2013.01); *B60H 1/3229* (2013.01); *B60H 1/3232* (2013.01); *B60P 3/20* (2013.01); *H02G 3/08* (2013.01)

(58) Field of Classification Search
  CPC .......... B60R 16/03; B60R 16/02; H02G 3/18; H02G 3/08; B60P 3/20
  See application file for complete search history.

(56) References Cited

U.S. PATENT DOCUMENTS

| | | |
|---|---|---|
| 2018/0017302 A1 | 1/2018 | Werker et al. |
| 2019/0193622 A1 | 6/2019 | Moon et al. |
| 2020/0223291 A1 | 7/2020 | Swab |
| 2022/0336993 A1 | 10/2022 | Alcarria Grande et al. |
| 2023/0347841 A1* | 11/2023 | Hunley ................ B60W 10/26 |

\* cited by examiner

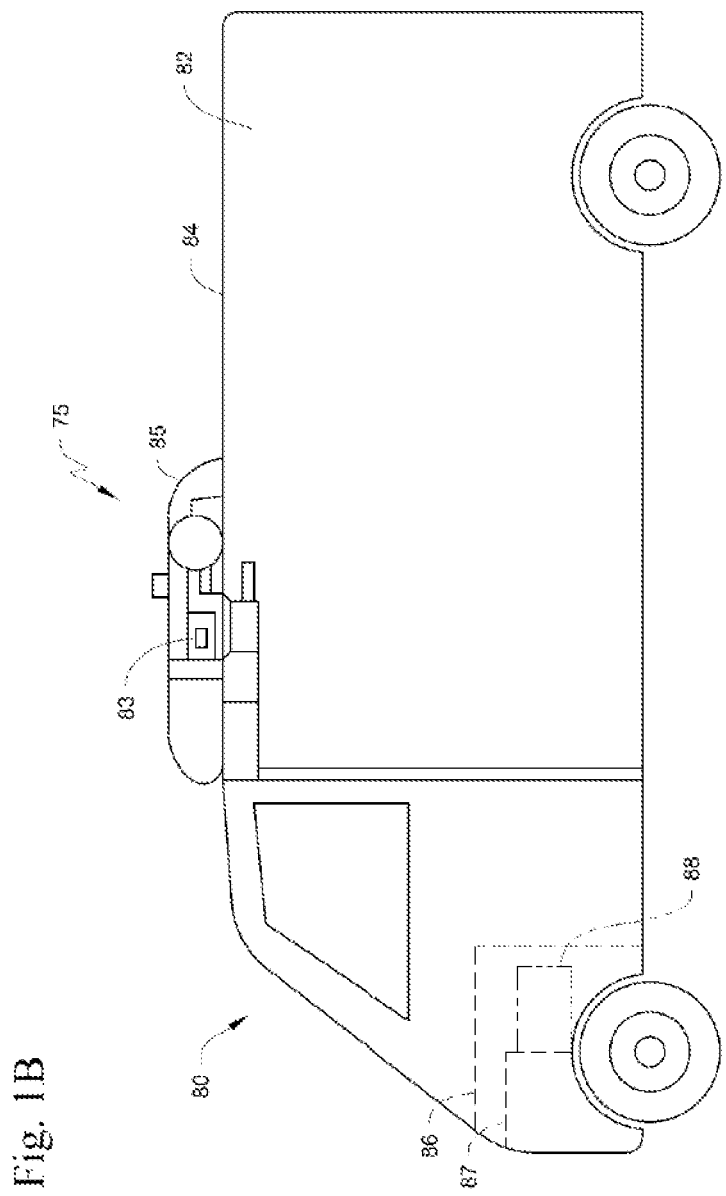

ELECTRICALLY ISOLATING HAZARDOUS VOLTAGE FROM VEHICLE POWERED TRANSPORT CLIMATE CONTROL SYSTEM

FIELD

This disclosure relates generally to a vehicle powered transport climate control system used to provide climate control within a climate controlled space towed by a vehicle or contained on a chassis. More particularly, the disclosure relates to methods and systems for isolating a hazardous voltage from a vehicle powered transport climate control system used to provide climate control within a climate controlled space towed by a vehicle or contained on a chassis.

BACKGROUND

A transport climate control system can include, for example, a transport refrigeration system (TRS). A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.).

SUMMARY

This disclosure relates generally to a vehicle powered transport climate control system used to provide climate control within a climate controlled space towed by a vehicle or contained on a chassis. More particularly, the disclosure relates to methods and systems for isolating a hazardous voltage from a vehicle powered transport climate control system used to provide climate control within a climate controlled space towed by a vehicle or contained on a chassis.

In an embodiment, the present disclosure describes a transport climate control system configured to provide climate control within a climate controlled space towed by a vehicle. The transport climate control system includes one or more climate control circuit components including a compressor, and a drive module being configured to receive power from a vehicle power network to power the compressor. The vehicle power network includes a rechargeable energy storage system (RESS). The transport climate control system further includes an electrical isolation box configured to house the drive module and the one or more climate control circuit components, and electrically isolate the drive module and the one or more climate control circuit components at a climate control system electrical potential reference. The climate control system electrical potential reference is different from an electrical potential reference of a vehicle chassis to which the electrical isolation box is connected.

In an embodiment, the present disclosure describes a method of electrically isolating a hazardous voltage from a vehicle powered transport climate control system used to provide climate control within a climate controlled space towed by a vehicle. The method includes providing, via a drive module, power to one or more climate control circuit components of the vehicle powered transport climate control system. The one or more climate control circuit components include a compressor. The drive module is configured to receive power from a vehicle power network including a rechargeable energy storage system (RESS). The method further includes electrically isolating, via an electrical isolation box, the drive module and the one or more climate control circuit components at a climate control system electrical potential reference. The climate control system electrical potential reference is different from an electrical potential reference of a vehicle chassis to which the electrical isolation box is connected.

In an embodiment, the present disclosure describes an electrical isolation box including one or more walls defining an at least partially enclosed space, the electrical isolation box comprising one or more plastic or metal materials at the one or more walls, and a mounting mechanism inside the at least partially enclosed space. The mounting mechanism is configured to support one or more climate control circuit components, and electrically isolate the one or more climate control circuit components at a climate control system electrical potential reference, the climate control system electrical potential reference being different from an electrical potential reference of a vehicle chassis to which the electrical isolation box is connected.

Various aspects and advantages of exemplary embodiments of the disclosure have been summarized. The above Summary is not intended to describe each illustrated embodiment. Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIG. 1B is a side view of a van with a vehicle powered transport climate control system, according to an embodiment.

Figure 1A:
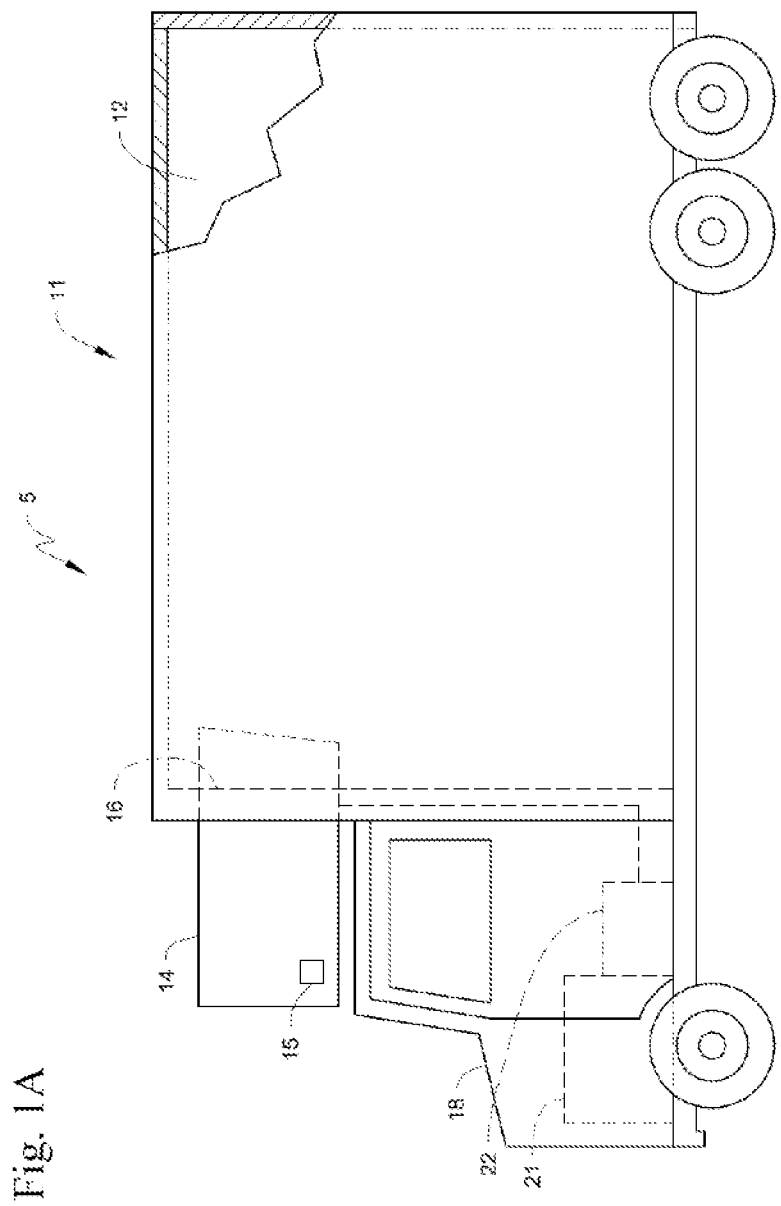
FIG. 1A is a side view of a truck with a vehicle powered transport climate control system, according to an embodiment.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent like elements that may perform the same, similar, or equivalent functions.

DETAILED DESCRIPTION

This disclosure relates generally to a vehicle powered transport climate control system used to provide climate control within a climate controlled space towed by a vehicle or contained on a chassis. More particularly, the disclosure relates to methods and systems for isolating a hazardous voltage from a vehicle powered transport climate control system used to provide climate control within a climate controlled space towed by a vehicle or contained on a chassis.

Features in the embodiments described herein may provide methods for electrically isolating the hazardous voltage by following the concept of double insulation, e.g., by using an electrical tool or appliance that incorporates an additional safety measure. For example, in one example embodiment, an electrical isolation box is applied as a barrier to isolate the hazardous voltage. When there is a leakage current from a hazardous voltage component/system that may be harmful, the leakage current can be properly isolated and contained to be inside an inaccessible location (e.g., the electrical isolation box) to prevent the leakage current from causing undesired issues.

The terms "above", "below", "top", "bottom", "left", "right", and the like described in the present application are defined according to the typical observation angle of a person skilled in the art and for the convenience of the description. These terms are not limited to specific directions but provided for ease of understanding the disclosure. As such, the terms should be interpreted broadly and can include, but not limited to, being directly adjacent, near, or spaced apart from the respective components.

As referenced herein, "low voltage" may refer to Class A of the ISO 6469-3 in the automotive environment. In particular, a maximum working voltage of between 0VDC and 60 VDC or between 0VAC and 30 VAC.

As referenced herein, "high voltage" or "hazardous voltage" may refer to Class B of the ISO 6469-3 in an automotive environment. In particular, a maximum working voltage of between 60 VDC and 1500 VDC or between 30 VAC and 1000 VAC.

FIG. 1A depicts a climate-controlled straight truck 11 that includes a climate controlled space 12 for carrying cargo. The truck 11 includes a vehicle powered transport climate control system 5. The vehicle powered transport climate control system 5 includes a climate control unit 14 that is mounted to a front wall 16 of the climate controlled space 12.

The transport climate control unit 14 includes a climate control circuit (not shown) including, for example, a compressor, a condenser, an evaporator, and an expansion valve. The transport climate control unit 14 can also include a heater, one or more evaporator fans, one or more condenser fans, one or more solenoid valves, etc. that assist in providing climate control (temperature, humidity, air quality, etc.) into the climate controlled space 12. The transport climate control unit 14 is controlled via a controller 15 to provide climate control within the climate controlled space 12. It will be appreciated that the transport climate control unit 14 may optionally house a power source (e.g., prime mover, batter power source, fuel cell, etc.) that can power the vehicle powered transport climate control system 5.

The truck 11 further includes a vehicle power bay 18, which houses a prime mover 21, such as a combustion engine (e.g., diesel engine, etc.), that provides power to move the truck 11 and to operate the vehicle powered transport climate control system 5. The prime mover 21 can work in combination with an optional machine 22 (e.g., an alternator, a generator, etc.) to power the vehicle powered transport climate control system 5.

In some embodiments, the truck 11 can be a hybrid vehicle that is powered by the prime mover 21 in combination with a battery power source (not shown) or can be an electrically driven truck in which the prime mover 21 is replaced with an electric power source (e.g., a battery power source).

In some embodiments, the truck 11 can be a battery electric vehicle (BEV) that may be powered solely by one or more electric motors and rely on rechargeable batteries as its energy storage system. It is to be understood that van or bus 80 of FIG. 1B, tractor 52 of FIG. 1C, and other vehicles described herein may be a BEV.

It will be appreciated that a power source of the truck 11 (e.g., the prime mover 21, the optional machine 22, an electric power source, etc.) may not exclusively power the vehicle powered transport climate control system 5 when operating at a full capacity. For example, the transport climate control unit 14 can house a power source (e.g., prime mover, batter power source, fuel cell, etc.) that can also provide power to the vehicle powered transport climate control system 5.

While FIG. 1A illustrates a climate-controlled straight truck 11, it will be appreciated that the embodiments described herein can also apply to any other type of transport unit including, but not limited to, a container (such as a container on a flat car, an intermodal container, etc.), a box car, or other similar transport unit.

FIG. 1B depicts a temperature-controlled van 80 that includes a climate controlled space 82 (or internal space) for carrying cargo. The van 80 includes a vehicle powered transport climate control system 75. The vehicle powered transport climate control system 75 includes a transport climate control unit 85 that is mounted to a rooftop 84 of the climate controlled space 82. The transport climate control unit 85 is controlled via a controller 83 to provide climate control (e.g., temperature, humidity, air quality, etc.) within the climate controlled space 82. It will be appreciated that the transport climate control unit 85 may, optionally, house a power source (e.g., prime mover, batter power source, fuel cell, etc.) that can power the vehicle powered transport climate control system 75.

The van 80 further includes a vehicle power bay 86, which houses a prime mover 87, such as an internal combustion engine (e.g., diesel engine, etc.), that provides power to move the van 80 and to operate the vehicle powered transport climate control system 75. In some embodiments, the prime mover 87 can work in combination with an optional machine 88 (e.g., an alternator, a generator, etc.) to operate the vehicle powered transport climate control system 75. Also, in some embodiments, the van 80 can be a hybrid vehicle that is powered by the prime mover 87 in combination with a battery power source (not shown) or can be an electrically driven truck in which the prime mover 87 is replaced with an electric power source (e.g., a battery power source).

It will be appreciated that a power source of the van 80 (e.g., the prime mover 87, the optional machine 88, an electric power source, etc.) may not exclusively power the vehicle powered transport climate control system 75 when operating at a full capacity. For example, the transport climate control unit 85 can house a power source (e.g., prime mover, batter power source, fuel cell, etc.) that can also provide power to the vehicle powered transport climate control system 75.

Figure 1C:
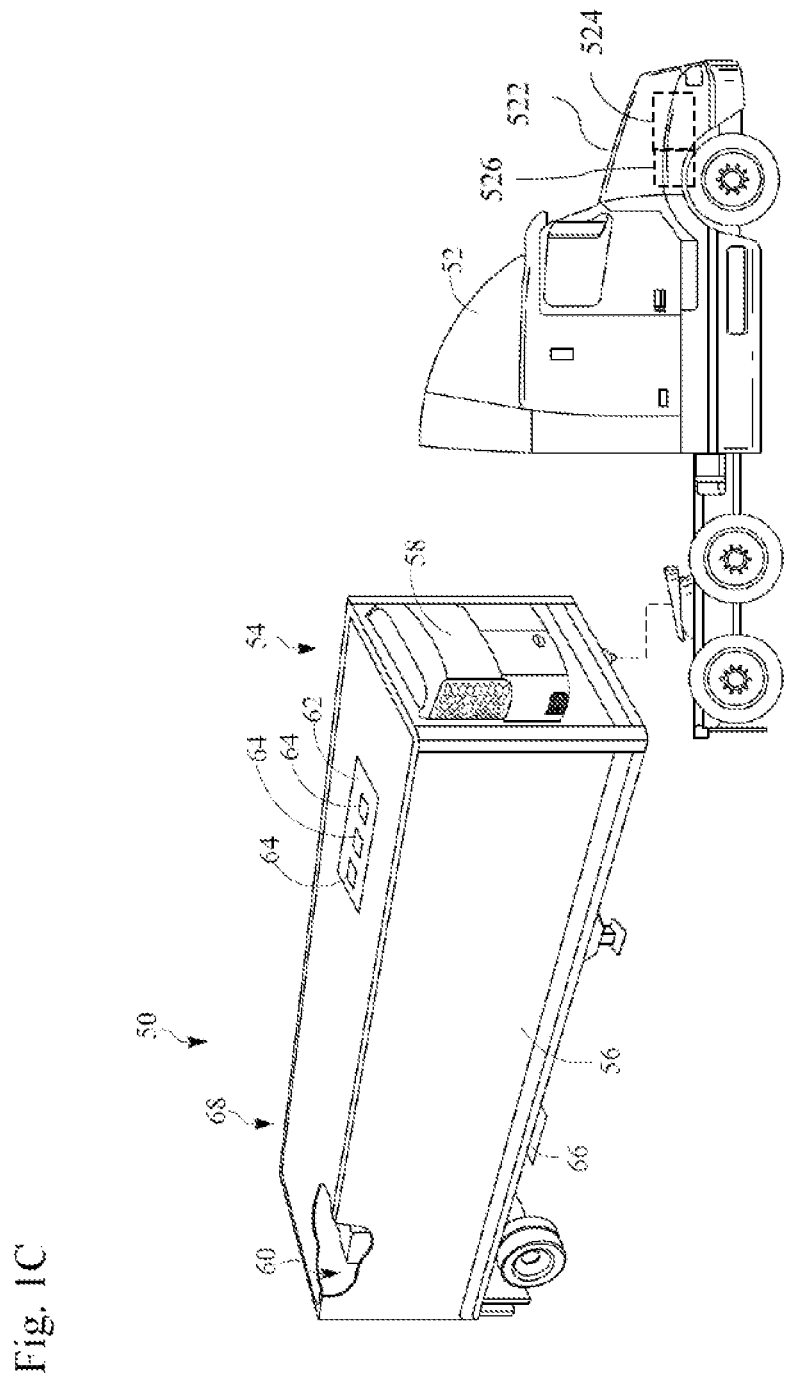
FIG. 1C is a side perspective view of a climate controlled transport unit having a trailer with a vehicle powered transport climate control system and attached to a tractor, according to an embodiment.

FIG. 1C illustrates a climate-controlled transport unit 50 having a trailer attached to a tractor 52, according to an embodiment. The climate-controlled transport unit 50 includes a transport climate control system 54, a mobile charging system 68, and a transport unit 56. The transport climate control system 54 is configured to control a temperature of a climate controlled space 60 of the transport unit 56. In particular, the transport climate control system 54 is configured to transfer heat between the climate controlled space 60 and the outside environment. In some embodiments, the transport climate control system 54 is a multi-zone system in which different zones or areas of the climate controlled space 60 are controlled to meet different climate control requirements based on the cargo stored in the particular zone. The transport climate control system 54 includes a transport climate control unit 58 for providing climate control within the climate controlled space 60. The climate controlled space 60 can store cargo including, for example, one or more self-contained climate controlled storage units that can be charged by the mobile charging system 68.

The mobile charging system 68 includes a solar charging unit 62 and a mobile charging system storage unit 66. The solar charging module 62 includes portions of a solar charging module of the mobile charging system 68 including a plurality of solar panel arrays 64. Each of the solar panel arrays 64 include a plurality of solar panels (not shown). In some embodiments, the solar charging unit 62 can be used by the mobile charging system 68 and provide electrical energy for use by the transport climate control system 54.

The mobile charging system storage unit 66 can store portions of the mobile charging system 68 including, for example, a battery bank (not shown), remaining portions of a solar charge module (not shown), an AC inverter charge module (not shown), a DC charge module (not shown), a DC charge controller (not shown), etc.

The tractor 52 further includes a vehicle power bay 522, which houses a prime mover 524, such as an internal combustion engine (e.g., diesel engine, etc.), that provides power to move the tractor 52 and to operate the vehicle powered transport climate control system 54. In some embodiments, the prime mover 524 can work in combination with an optional machine 526 (e.g., an alternator, a generator, etc.) to operate the vehicle powered transport climate control system 54. Also, in some embodiments, the tractor 52 can be a hybrid vehicle that is powered by the prime mover 524 in combination with a battery power source (not shown) or can be an electrically driven tractor in which the prime mover 524 is replaced with an electric power source (e.g., a battery power source).

It will be appreciated that a power source of the tractor 52 (e.g., a prime mover, an optional machine, an electric power source, etc.) may not exclusively power the vehicle powered transport climate control system 54 when operating at a full capacity. For example, the transport climate control unit 58 can house a power source (e.g., prime mover, batter power source, fuel cell, etc.) that can also provide power to the vehicle powered transport climate control system 54. Also, for example, the mobile charging system 68 can also provide power to the vehicle powered transport climate control system 54.

Figure 1D:
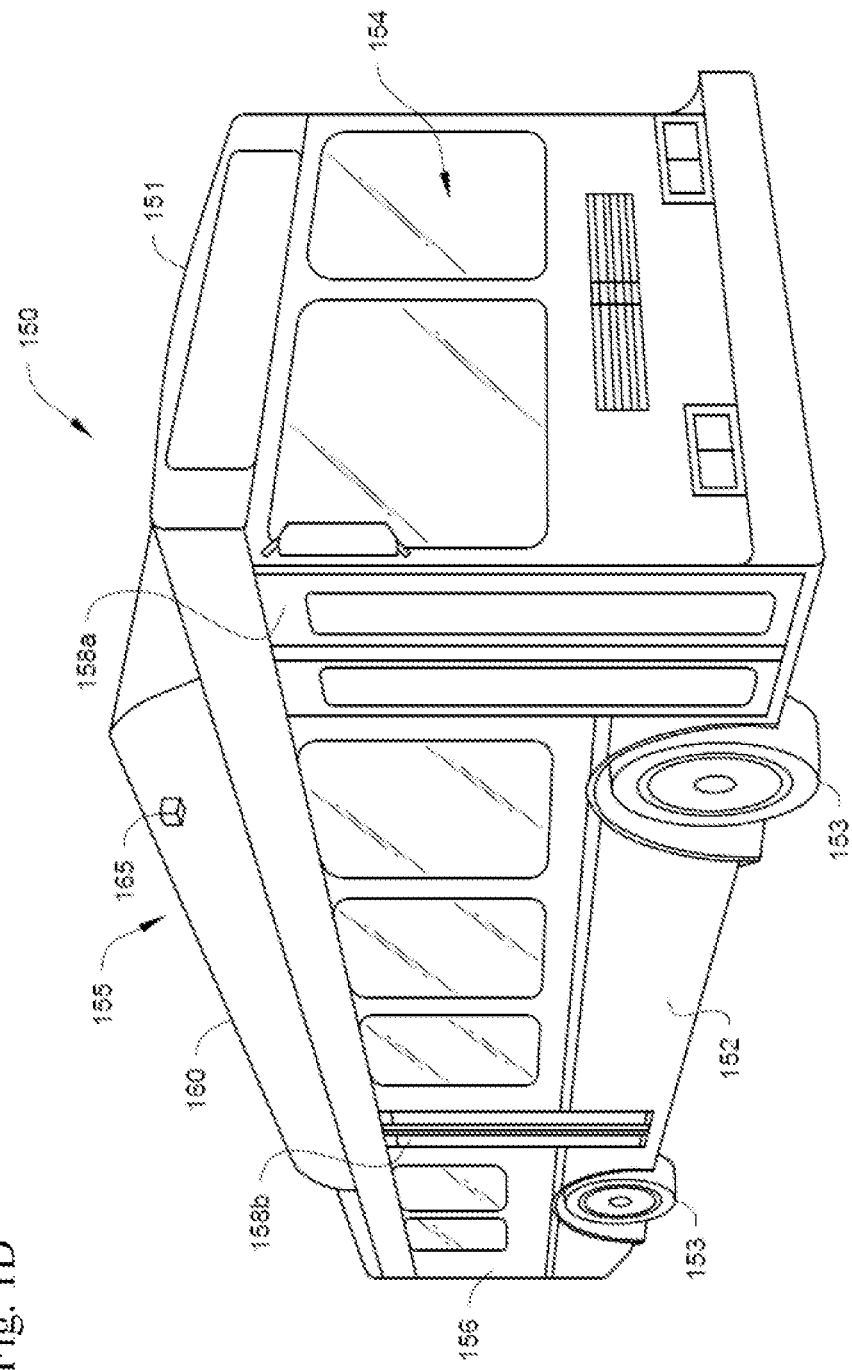
FIG. 1D is a perspective view of a passenger vehicle including a transport climate control system, according to one embodiment.

FIG. 1D is a perspective view of a passenger vehicle 150 including a vehicle powered transport climate control system 155, according to one embodiment. In the embodiment illustrated in FIG. 1D, the passenger vehicle 150 is a mass-transit bus that can carry passenger(s) (not shown) to one or more destinations. In other embodiments, the passenger vehicle 150 can be a school bus, railway vehicle, subway car, or other commercial vehicle that carries passengers. Hereinafter, the term "vehicle" shall be used to represent all such passenger vehicles, and should not be construed to limit the scope of the application solely to mass-transit buses. The vehicle transport climate control system 155 can provide climate control within a climate controlled space which is a passenger compartment 154 in this embodiment.

The passenger vehicle 150 includes a frame 152, a passenger compartment 154 supported by the frame 152, wheels 153, and a compartment 156. The frame 152 includes doors 158 that are positioned on a side of the passenger vehicle 150. A first door 158a is located adjacent to a forward end of the passenger vehicle 150, and a second door 158b is positioned on the frame 152 toward a rearward end of the passenger vehicle 150. Each door 158 is movable between an open position and a closed position to selectively allow access to the passenger compartment 154.

The vehicle powered transport climate control system 155 includes a CCU 160 that is mounted to a rooftop 151 of the passenger vehicle 150. In an embodiment, the CCU 160 can be a HVAC unit. The climate control system 155 also includes a programmable climate controller 165 and one or more sensors (not shown) that are configured to measure one or more parameters of the transport climate control system 155 (e.g., an ambient temperature outside of the passenger vehicle 150, a space temperature within the passenger compartment 154, an ambient humidity outside of the passenger vehicle 150, a space humidity within the passenger compartment 154, etc.) and communicate parameter data to the climate controller 165.

The transport climate control system 155 can include, among other components, a transport climate control circuit (not shown) that connects, for example, a compressor, a condenser, an evaporator, and an expander (e.g., an expansion valve) to provide climate control within the passenger compartment 154.

The climate controller 165 may comprise a single integrated control unit or may comprise a distributed network of climate controller elements (not shown). The number of distributed control elements in a given network can depend upon the particular application of the principles described herein. The climate controller 165 is configured to control operation of the climate control system 155 including the transport climate control circuit.

The climate control system 135 is powered by a power system (see, for example, FIG. 2) that can distribute power to the climate control system 135.

The passenger vehicle 150 further includes a vehicle power bay 156, which houses a prime mover (not shown), such as an internal combustion engine (e.g., diesel engine, etc.), that provides power to move the passenger vehicle 150 and to operate the vehicle powered transport climate control system 155. In some embodiments, the prime mover can work in combination with an optional machine (e.g., an alternator, a generator, etc.) (not shown) to operate the vehicle powered transport climate control system 155. Also, in some embodiments, the passenger vehicle 150 can be a hybrid vehicle that is powered by the prime mover in combination with a battery power source (not shown) or can be an electrically driven vehicle in which the prime mover is replaced with an electric power source (e.g., a battery power source). The vehicle power bay 156 is located adjacent the rear end of the passenger vehicle 150. In some embodiments, the vehicle power bay 156 can be located at other locations on the passenger vehicle 150 (e.g., adjacent the forward end, etc.).

It will be appreciated that a power source of the passenger vehicle 150 (e.g., the prime mover, the optional machine, an electric power source, etc.) may not exclusively power the vehicle powered transport climate control system 155 when operating at a full capacity. For example, the CCU 160 can house a power source (e.g., prime mover, batter power source, fuel cell, etc.) that can also provide power to the vehicle powered transport climate control system 155.

Figure 2:
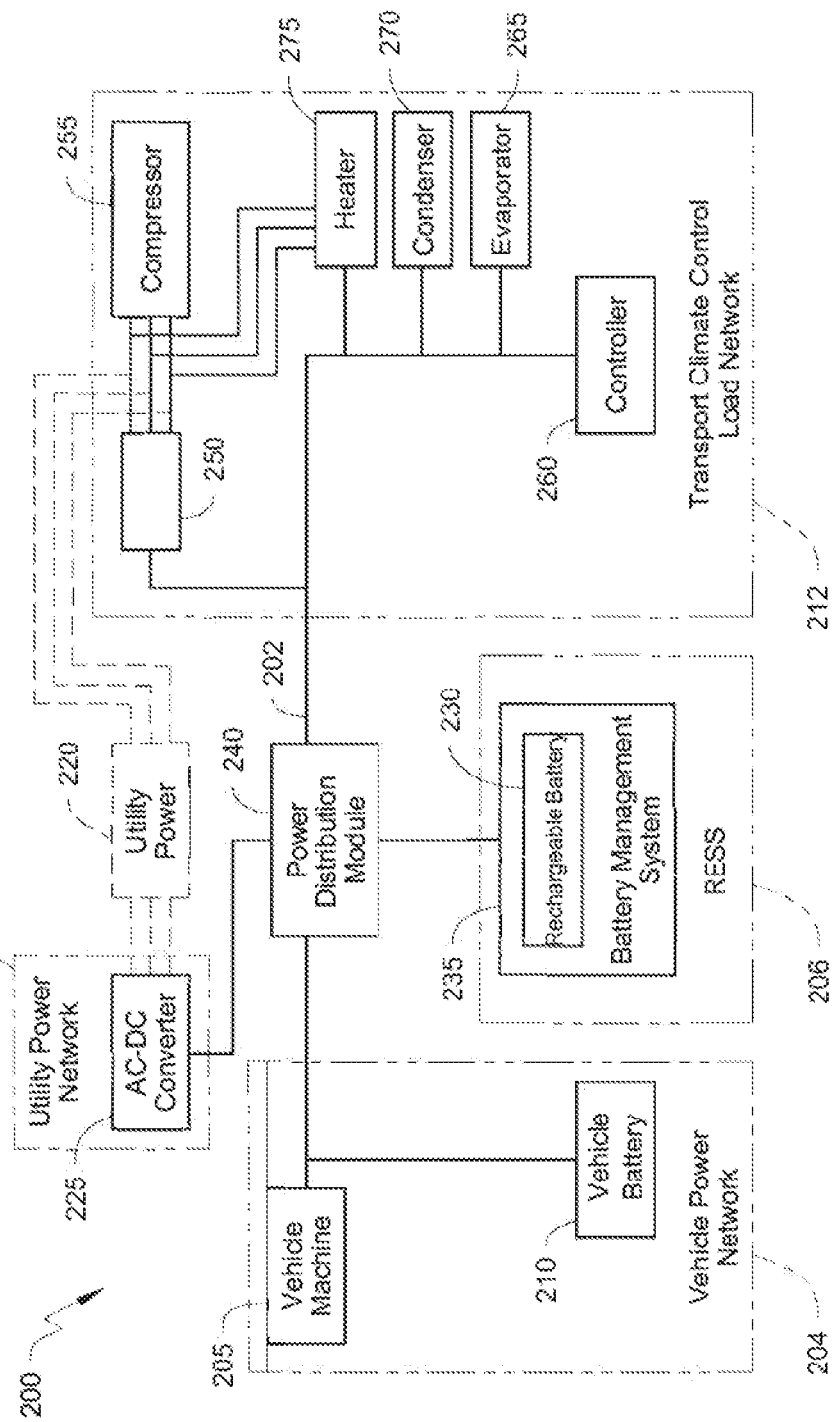
FIG. 2 illustrates a block diagram schematic of one embodiment of a power system for powering a vehicle powered transport climate control system, according to an embodiment.

FIG. 2 illustrates a block diagram schematic of one embodiment of a power system 200 for powering a vehicle powered transport climate control system such as, for example, the system 5 in FIG. 1A, the system 75 in FIG. 1B, the system 54 in FIG. 1C, and the system 155 in FIG. 1D. The power system 200 may be configured to operate with a prime mover powered vehicle. The power system 200 may also be configured to operate with an electric vehicle powered by an energy storage device (e.g., one or more batteries) and/or a hybrid vehicle powered by a combination of a prime mover and an energy storage device.

As shown in FIG. 2, the power system 200 includes the vehicle power network 204 including a rechargeable energy storage system (RESS) 206, a utility power network 208, and a transport climate control load network 212 connected to a power distribution module 240.

The power system 200 can distribute, via the power distribution module 240, utility power from the utility power network 208 and vehicle network power from the vehicle power network 204 including the RESS 206 to power the transport climate control load network 212. The one or more energy sources can include a vehicle battery 210 and a vehicle machine 205 via the vehicle power network 204, and one or more rechargeable batteries 230 via the RESS 206. The loads of the transport climate control load network 212 can include, for example, a compressor 255, one or more evaporator blowers 265, one or more condenser fans 270, a heater 275, and a controller 260 of a vehicle powered transport climate control system. The loads can also include, for example, one or more sensors, one or more valves, one or more solenoids, etc. of the transport climate control system. It will be appreciated that in some embodiments, the compressor 255 can require the most amount of power of the vehicle powered transport climate control system.

The vehicle power network 204 is configured to provide a vehicle network power to be distributed by the power distribution module 240 to power the transport climate control load network 212. The vehicle power network 204 includes the vehicle battery 210 and the vehicle machine 205. The vehicle battery 210 can be used, for example, for starting a vehicle prime mover, running lights, powering vehicle accessory components, etc. In some embodiments, the vehicle battery 210 can also be used to power components of the transport climate control load network 212. It will be appreciated that vehicle network power provided by the vehicle power network 204 may be inconsistent and based on operation and vehicle load requirements of the vehicle. Accordingly, the vehicle network power can continuously fluctuate. Also, it will be appreciated that the maximum vehicle network power that is available to the power system 200 may be insufficient to operate the vehicle powered transport climate control system operating at a full capacity.

In some embodiments, the vehicle battery 210 may include a traction battery pack in an electric vehicle that typically stores electrical energy in the form of high-voltage DC power. The voltage level of the traction battery pack may be in the range, for example, several hundred volts or higher.

The vehicle machine 205 can be an electrical generator that can provide DC power to the vehicle. In some embodiments, the vehicle machine 205 can include an alternator and a rectifier or an AC-DC converter (not shown) that rectifies or converts the AC power to a DC power.

It will be appreciated that in electric vehicles, there may be no machine. Electric vehicles can include a motor generator and a high voltage (e.g., in a range between 60 VDC and 1500 VDC; for example, 400 VDC, 800 VDC, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400 VDC, 800 VDC, etc.) to a low voltage (e.g., in a range between 0VDC and 60 VDC; for example, 12 VDC). That is, the vehicle machine 205 can be replaced with a DC-DC converter having similar parameters as the vehicle machine 205 in order to be able to provide vehicle network power to the power distribution module 240. The vehicle network power can be used to power vehicle accessory components (e.g., electronic communication devices, cabin lights, a primary and/or secondary HVAC system, primary and/or secondary HVAC fan(s), sunshade(s) for a window/windshield of the vehicle 10, cabin accessories, etc.).

In some embodiments, the high voltage or converted low voltage (e.g. 12 VDC) from the vehicle power network 204 can be provided to the power distribution module 240 for powering the transport climate control load network 212. In some embodiments, the vehicle power network 204 may be applied for a multi-voltage system using two or more different voltages (e.g., a high voltage and 48 VDC). In some embodiments, an electric vehicle can provide for example, 7 kW-Hour energy from a 45 kW-Hour storage of the vehicle power network 204 to the power distribution module 240 to run the transport climate control load network 212. Embodiments disclosed herein can use take off power (e.g., electric power take off or ePTO) from the low voltage (for example, 12 VDC) system for loads such as vehicle accessory components and/or the power distribution module 240. The high voltage power can provide power for driving the vehicle (e.g., transmission power take off) and the power system 200 herein may take electric power from the high voltage system.

It will be appreciated that in a hybrid vehicle, there may be a machine (such as the vehicle machine 205) and/or a low voltage DC power source that can provide a low voltage (e.g., 12 VDC) to the power distribution module 240.

It will be appreciated that any type of power source from the vehicle that can provide power to the power system 200 can be part of the vehicle power network 204. This can include, for example, the vehicle machine 205, the vehicle battery 210, a RESS, a generator, an axle-mounted generator, a power take off (PTO) device or ePTO device with an auxiliary converter, etc.

In some embodiments, a voltage sensor (not shown) can be provided in the vehicle power network 204 to monitor a vehicle voltage provided to the power distribution module 240. Also, in some embodiments, a current sensor (not shown) can be provided to monitor the current to the power distribution module 240.

The RESS 206 includes a rechargeable battery source 230 and a battery management system 235. In some embodiments, the RESS 206 can be part of the vehicle powered transport climate control system and potentially housed within a transport climate control unit. In other embodiments, the RESS 206 can be external to the vehicle powered transport climate control system and part of the vehicle power network 204. In yet some other embodiments, the RESS 206 can be external to the vehicle powered transport climate control system and external to the vehicle power network 204. For example, the RESS 206 can be part of an auxiliary power unit (APU) that is mounted to the vehicle.

In some embodiments, the rechargeable battery source 230 can include one or more rechargeable batteries. For example, in one embodiment the battery source 230 can include two rechargeable batteries (not shown). Each of the rechargeable batteries can also be connected to the power distribution module 240. It will be appreciated that in some embodiments, the rechargeable battery source 230 can provide sufficient energy to power the transport climate control load network 212 by itself. In some embodiments, the rechargeable battery source 230 can provide 400 VDC or 800 VDC. In other embodiments, the rechargeable battery source 230 can provide 48 VDC, which may be converted up to, for example, 400 VDC using a converter which may be contained in an enclosure such as an electrical isolation box.

The battery management system 235 is configured to monitor a charge level of the one or more rechargeable batteries of the battery source 230 and charge the one or more rechargeable batteries of the battery source 230. The battery management system 235 can communicate with, for example, the controller 260 and/or a controller (not shown) of the power distribution module 240 to provide a charge level of one or more rechargeable batteries of the battery source 230. Also, the battery management system 235 can receive instructions from, for example, the controller 260 and/or the controller of the power distribution module 240 indicating the amount of power from the rechargeable battery source 230 should be supplied to the power distribution module 240.

The power distribution module 240 is configured to distribute a DC power from the utility power network 208, and the vehicle power network 204 including the RESS 206 to a load power compatible with one or more loads of the transport climate control load network 212. The power distribution module 240 may include one or more switches configured to selectively connect at least one power input (e.g., from a DC power from the utility power network 208, and/or the vehicle power network 204) to the power bus 202. The controller 260 can control the on/off (close/open) of the switches to distribute power.

In some embodiments, the power distribution module 240 can be configured to buck or boost power from the vehicle power network 204 and be configured to buck or boost power from RESS 206 to obtain the desired load power. In some embodiments, the power distribution module 240 can include one or more DC/DC converters. For example, the power distribution module 240 can include one DC/DC converter to convert the underpowered vehicle network power to a voltage compatible with one or more loads of the transport climate control load network 212 and a second DC/DC converter to convert the auxiliary network power to a voltage compatible with one or more loads of the transport climate control load network 212. The converted power from the vehicle power network 204 and the converted power from the RESS 206 can be combined to obtain the load power compatible with one or more loads of the transport climate control load network 212. The load power outputted by the power distribution module 240 is then provided on a load DC bus 202 to the transport climate control load network 212. In some embodiments, the load power can be a low voltage DC power (e.g., between 0-60 VDC). In other embodiments, the load power can be a high voltage DC power (e.g., between 60-1500 VDC).

In some embodiments, the power distribution module 240 can include a controller (not shown) configured to monitor and control the power distribution module 240. In some embodiments, the controller of the power distribution module 240 can communicate with the controller 260.

The power system 200, and particularly the power distribution module 240, is controlled by the controller 260 of the transport climate control load network 212. The controller 260 can be, for example, the controller 15 shown in FIG. 1A or the controller 83 shown in FIG. 1B. In some embodiments, the power distribution module 240 can monitor the amount of current and/or voltage provided by the vehicle power network 204. Also, in some embodiments, the power distribution module 240 can monitor the amount of current and/or voltage drawn by components of the transport climate control load network 212. The power distribution module 240 can be configured to communicate the amount of current and/or voltage provided by the vehicle power network 204 and the amount of current and/or voltage drawn by components of the transport climate control load network 212.

Components of the transport climate control load network 212 can be, for example, part of a transport climate control unit that is mounted to the body of the vehicle (for example, truck, van, etc.). In some embodiments, the transport climate control unit can be above the cab of the truck (as shown in FIG. 1A). In other embodiments, the transport climate control unit can be on the top of the transport unit (for example, a top of a box where the external condensers are located) (see FIG. 1B). In yet some other embodiments, the transport climate control unit can be attached to a side wall of a transport unit that is towed by a tractor (see FIG. 1C). In some embodiments, the components of the transport climate control load network 212 can be DC powered components. In some embodiments, the components of the transport climate control load network 212 can be AC powered components. In some embodiments, the transport climate control load network 212 can include both DC powered components and AC powered components.

As shown in FIG. 2, the transport climate control load network 212 includes one or more climate control circuit components including a compressor 255, one or more evaporator blowers 265, one or more condenser fans 270, and the heater 275, and the controller 260. The transport climate control load network 212 further includes a drive module 250 configured to receive power from the power distribution module 240 to power the one or more climate control circuit components including the compressor 255 and/or the heater 275.

In an embodiment, the drive module 250 is configured to receive or provide a high-voltage power referring to Class B of ISO 6469-3 with a maximum working voltage of between 60V and 1500 VDC or between 30V and 1000 VAC. For example, the drive module 250 may receive and convert high voltage DC power (for example, several hundred volts DC or higher) from the load DC bus 202 to provide AC power (for example, 230 VAC three phase, 460 VAC three phase, etc.) to drive the compressor 255. It is to be understood that the drive module 250 can be configured to drive the compressor 255 to meet demand of the transport climate control system.

In some embodiments, the drive module 250 may be configured to boost the load power and convert the boosted load power to an AC load power. For example, in an embodiment, the drive module 250 may include one or more DC-to-DC converters configured to boost power from the DC load bus 202, and include one or more DC-to-AC inverts to convert the power to AC power to drive the compressor 255. In some embodiments, the drive module 250 can convert the load power to a high voltage AC power. As shown in FIG. 2, the drive module 250 is configured to power the compressor 255 and optionally the heater 275. It will be appreciated that in other embodiments, the drive module 250 can power other components of the transport climate control load network 212 such as, for example, the one or more evaporator blowers 265, the one or more condenser fans 270, etc. In some embodiments, the drive module 250 may include a Compressor Drive Module (CDM).

The load DC bus 202 is connected to and powers each of the drive module 250, the one or more evaporator blowers 265, the one or more condenser fans 270, the heater 275, and the controller 260. It will be appreciated that the drive module 250 with the compressor 255 can require the most power of the various loads of the transport climate control load network 212. As shown in FIG. 2, in some embodiments, the drive module 250 can also power the heater 275.

The utility power network 208 is configured to charge the battery source 230 of the RESS 206 when the vehicle is parked and has access to a utility power source 220. In some embodiments, the utility power network 208 can also provide power to operate the transport climate control load network 212 when the vehicle is parked and has access to a utility power source. The utility power network 208 includes the AC-DC converter 225. The utility power source (e.g., shore power, etc.) 220 can be connected to the AC-DC converter 225 to provide AC power input to the AC-DC converter 225. The AC-DC converter 225 converts the AC power from the utility power source 220 and provides converted DC power to the power distribution module 240.

While FIG. 2 shows a single AC-DC converter 225, it is appreciated that in other embodiments the power system 200 can includes two or more AC-DC converters. In embodiments where there are two or more AC-DC converters, each of the AC-DC converters can be connected to the utility power 220 to provide additional power capacity to the power system 200. In some embodiments, each of the AC-DC converters can provide different amounts of power. In some embodiments, each of the AC-DC converters can provide the same amount of power.

In some embodiments, the utility power 220 can be connected directly to the compressor 255 and provide power to drive the compressor 255 thereby bypassing the drive module 250. In some embodiments, the drive module 250 can include an AC-DC inverter and convert power received from the utility power 220 into DC power that can be provided by the drive module 250 to the load DC bus 202.

In some embodiments, the compressor 255 can be a variable speed compressor. In some embodiments, the compressor 255 can require, for example, 1 KW of power to operate. In some embodiments, the one or more evaporator blowers 265 can require, for example, 100 W of power to operate. In some embodiments, the one or more condenser fans 270 can require, for example, 130 W of power to operate. In some embodiments, the heater 275 can require, for example, 1200 W of power to operate. Also, in some embodiments, the heater 275 can be configured to receive power from the drive module 250. While the compressor 255 shown in FIG. 2 is powered by AC power, it will be appreciated that in other embodiments the compressor 255 can be powered by DC power.

When the compressor 255 and/or the heater 275 are powered directly by the utility power 220, the compressor 255 and/or the heater 275 can be turned on and off (e.g., operate in a cycle sentry mode) in order to control the amount of cooling provided by the compressor 255 and/or the amount of heating provided by the heater 275.

The controller 260 is configured to monitor and control operation of the vehicle powered transport climate control system. In particular, the controller 260 can control operation of the compressor 255, the heater 275, the one or more condenser fans 270, the one or more evaporator blowers 265 and any other components of the vehicle powered transport climate control system. In some embodiments, the controller 260 can monitor the amount of power drawn by the components of the transport climate control load network 212. The controller 260 can also be configured to control the power system 200.

Figure 3:
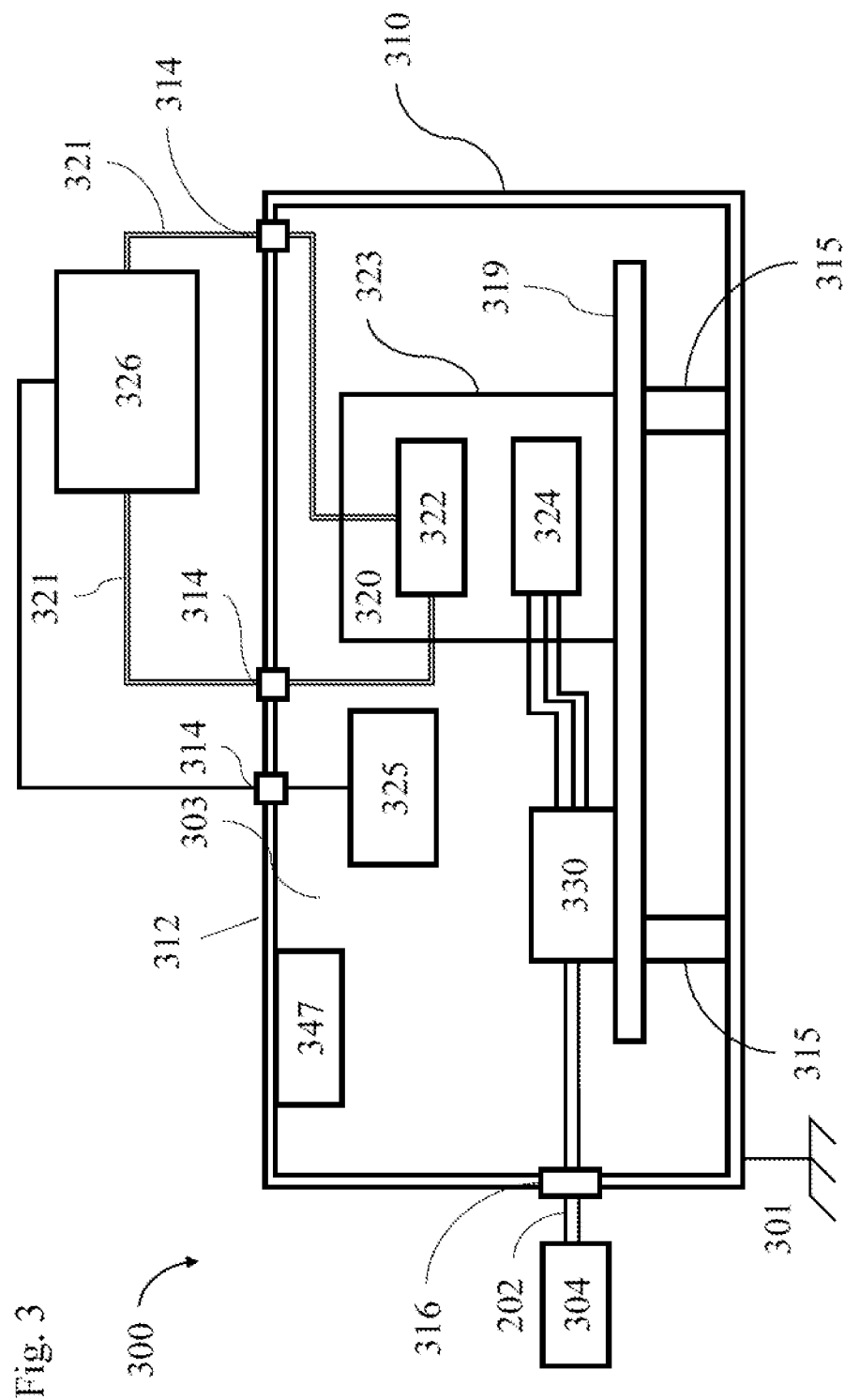
FIG. 3 is a schematic diagram of a vehicle powered transport climate control system including an electrical isolation box, according to an embodiment.

FIG. 3 is a schematic diagram of a portion of a vehicle powered transport climate control system 300 including an electrical isolation box 310, according to an embodiment. The transport climate control system 300 is configured to provide climate control within a climate controlled space towed by a vehicle or contained on a chassis. The transport climate control system 300 can include one or more components from, for example, the transport climate control system 5 in FIG. 1A, the transport climate control system 75 in FIG. 1B, and/or the transport climate control system 54 in FIG. 1C. In the depicted embodiment of FIG. 3, the transport climate control system 300 includes one or more climate control circuit components including a compressor 320.

A drive module 330 is configured to receive power from a vehicle power network (e.g., the vehicle power network 204 in FIG. 2) to power the compressor 320. The drive module 330 may be connected, via the power bus 202, to a power distribution module such as, e.g., the power distribution module 204 of FIG. 2 to receive a DC power. The power distribution module 204 may include an external portion located outside of the electrical isolation box 310 and an internal portion located inside the electrical isolation box 310. The external portion and the internal portion may have different references (e.g., a low-voltage reference and a high-voltage reference), and can be electrically connected to distribute power from a vehicle power network to the drive module 330. For example, a DC-DC converter may span the boundary of a box wall (e.g., the wall 312). In the embodiment depicted in FIG. 3, a DC power distribution unit (PDU) 304 is located outside of the electrical isolation box 310 to direct DC power, via the power bus 202, to the drive module 330.

The drive module 330 may include a DC-to-AC inverter to power at least one of the compressor 320 and a heater 325. In an embodiment, the DC-to-AC inverter may receive a high-voltage DC power from a vehicle battery (e.g., the vehicle battery 210 of FIG. 2) and convert the high-voltage DC power into an appropriate form of low-voltage AC power before supplying the AC power to the compressor 320 and/or the heater 325. A suitable inverter may include power electronic components such as transistors, switches, and control circuit that convert the high-voltage DC power to AC power with the desired voltage, frequency, and/or waveform that matches, for example, the compressor 320. It is to be understood that the heater 325 received in the box 310 may receive AC power from a DC-to-AC inverter, or DC power from the DC bus 202 where the PDU 304 may include a switch to direct the DC power to the heater 325.

The drive module may further include one or more DC-to-DC converters electrically connected to the DC-to-AC inverter to buck or boost power from the vehicle power network 204 and be configured to buck or boost power from RESS 206 to obtain the desired load power.

The compressor 320 includes a compressor element 322 driven by an electric motor 324 which is powered by the drive module 330. The compressor element 322 and the electric motor 324 are received in a compressor housing or shell 323. The climate control circuit components of the transport climate control system 300 further incudes the heater 325 and other system components 326 such as, for example, coils, valves, etc.

An electrical isolation box 310 is provided to receive the drive module 330, the compressor 320, the heater 325, and other system components. In an embodiment, the electrical isolation box 310 may receive a working fluid (e.g., a refrigerant, a glycol, etc.) which can pass heat from the heater 325 to an external heat exchanger (e.g., a coil). The electrical isolation box 310 is further configured to electrically isolate the drive module 330 and the received climate control circuit components 320, 325 at a climate control system electrical potential reference. The climate control system electrical potential reference is different from an electrical potential reference of a vehicle chassis to which the electrical isolation box 310 is connected. For example, in the embodiment depicted in FIG. 3, the electrical isolation box 310 is connected to a chassis ground 301, which refers to the electrical potential reference of the vehicle chassis. As referenced herein, "chassis ground" (a ground connection, or a ground reference) may refer to an electrical connection that provides a common reference point for various electrical components and systems, which may exist, e.g., when the electrical components and systems are connected to an earth-referenced utility power supply. The electrical isolation box 310 provides a physical barrier (e.g., a Faraday cage) to prevent any electrical current from flowing between the components inside the box 310 to the vehicle chassis.

The electrical isolation box 310 includes a wall 312 defining an at least partially enclosed space 303. In an embodiment, the electrical isolation box 310 may include at the wall 312, one or more metal materials to form a Faraday cage having an electromagnetic compatibility (EMC). The electrical isolation box 310 may further include one or more plastic materials for electrical isolation/insulation. The electrical isolation box 310 may further include a sound dampening material at the wall 312 to isolate noise that may be generated inside the box 310. It is to be understood that the electrical isolation box 310 may include any suitable materials and have any suitable configurations to achieve the effects of electrical isolation, noise isolation, and/or electromagnetic compatibility (EMC). Suitable plastic materials may include, for example, fiberglass-reinforced plastic (FRP), polycarbonate, etc. One example plastic material is FR-4 which is a composite material composed of woven fiberglass cloth with an epoxy resin binder. Another example plastic material is G-10 or garolite which is a high-pressure fiberglass laminate. Suitable sound dampening materials may be disposed on an inner side of the wall 312 to provide sound dampening effects as well as insulative effects.

The electrical isolation box 310 may have its walls 312 sealed to maintain its integrity as a portion of the system 300. Any suitable sealing materials can be used to prevent an ingress of moisture, dust, or other contaminants into the electrical isolation box 310. In one example embodiment, the electrical isolation box 310 may include a drain hole, e.g., at a bottom of the box to drain any accumulated moisture. The drain hole may include, e.g., a waterproof and breathable fabric which can provide protection for the components inside the box and allow moisture vapor to escape. In one example embodiment, the electrical isolation box 310 may include a cover for manufacturability. Special fasteners or features may be used to keep an unauthorized entity from accessing the box 310 when a voltage presents at the components inside the box 310. The box cover may be fixed (e.g., glued) on the box 310 which may require remanufacturing by an authorized entity.

The electrical isolation box 310 may include one or more entry/exit points or interfaces at the walls 312 to allow the passage of cables/tubes/lines while maintaining the integrity of the enclosure. One or more electrically non-conductive material can be disposed at the interfaces to electrically isolate the cables/tubes/lines from the electrical isolation box 310.

The electrical isolation box 310 may be mounted to a vehicle chassis. Vibration-damping materials and/or electrical isolation materials can be used to reduce the transmission of mechanical vibrations and provide mechanical protection/electrical isolation to the components housed by the electrical isolation box 310.

One or more sensors (e.g., a voltage sensor, a current sensor, etc.) can be provided to monitor isolation of the components inside the electrical isolation box 310, e.g., from the box walls 312. A controller (e.g., the controller 260 of FIG. 2) can receive sensing data from the sensors to monitor the isolation. The isolation monitoring data from the sensors can be measured with respect to a climate control system electrical potential reference and/or an electrical potential reference of a vehicle chassis, which may improve the isolation monitoring capability. With the received sensing data, the controller can monitor from the electrical net of interest to the chassis reference, to the electrical isolation box 310, or to the new reference in the box 310 (e.g., the climate control system electrical potential reference). The controller can analyze each of the measured sensing data to deduce where a failure lies and predict degradation in insulation before it even becomes an issue. In this manner, the controller can provide a maintenance early indicator, in addition to a reporting of a fault.

The drive module 330, the compressor 320 and the heater 325 are disposed inside the electrical isolation box 310 and are electrically isolated from the electrical isolation box 310. A mounting plate 319 is provided with an electrically non-conductive support 315 inside the electrical isolation box 310 to support and electrically isolate the drive module 330 and the compressor housing or shell 323 from the electrical isolation box 310. The mounting plate 319 may serve as a special reference plane to ensure leakage currents have a special place to pass/conduct between the components received inside the electrical isolation box 310. The support 315 can isolate/insulate the mounting plate 319 from the electrical isolation box 310, which can ensure proper creepage and clearance for achieving electrical isolation between high-voltage components or circuits. The electrically non-conductive support 315 may include, for example, an insulating fiberglass material, a rubber, etc. In an embodiment, an accelerometer or other suitable sensors can be connected to the mounting plate 319 to detect a vibration of the compressor 320.

The compressor 320 may be connected to other circuit components 326 via one or more working fluid tubes/lines 321. The tubes/lines 321 may be made of a non-conductive material. The tubes/lines 321 can be further isolated from the box wall 412 by disposing an electrically non-conductive material at an interface 314 where the working fluid tubes/lines 321 from the compressor 322 pass through the wall 312 of the electrical isolation box 310. The electrically non-conductive material may include, for example, an insulating fiberglass material, a rubber, etc. It is to be understood that any suitable isolation/insulating mechanism can be used to electrically isolate the components inside the box 310 from the box walls 312. Suitable isolation mechanisms may include, for example, isolation/insulating mounts, isolation/insulating pads, isolation/insulating gaskets, etc.

The drive module 330 receives power from the power distribution module 240 via the DC bus 202. An electrically non-conductive material is disposed at the interface 316 where the DC bus 202 passes through the wall 312 of the electrical isolation box 310 to provide electrical isolation. The electrically non-conductive material may include, for example, an insulating fiberglass material, a rubber, etc. It is to be understood that the interfaces 314, 316 may include any suitable high-voltage connection components including, for example, a header mounted on the wall 312 and a plug connecting to the header, which can be sealed and/or shielded.

A cooling fan 347 is provided inside the electrical isolation box 310 to circulate air (e.g., cold airflow in and warm airflow out of the space 303) through a vent at the wall 312. The airflow generated by the cooling fan 347 can help to dissipate heat from components inside the electrical isolation box 310, which can prevent a potential issue of current leakage from the components. The box 310 may further include one or more additional labyrinth style venting mechanisms for airflow support. It is to be understood that a liquid cooling mechanism may be provided to circulate a semi-conductive cooling liquid to cool down at least some components inside the electrical isolation box 310. The liquid cooling mechanism may include a liquid line to circulate the cooling liquid. An electrically non-conductive material may be disposed at an interface at which the liquid line passes through the wall 312 of the electrical isolation box 310 to provide electrical isolation.

It is to be understood that the box 310 may serve as a barrier to prevent an undesired access/entry. For example, the box 310 may be glued shut and/or include special fasteners or screws to provide an additional level of security, which may require remanufacturing by an authorized entity.

Figure 4:
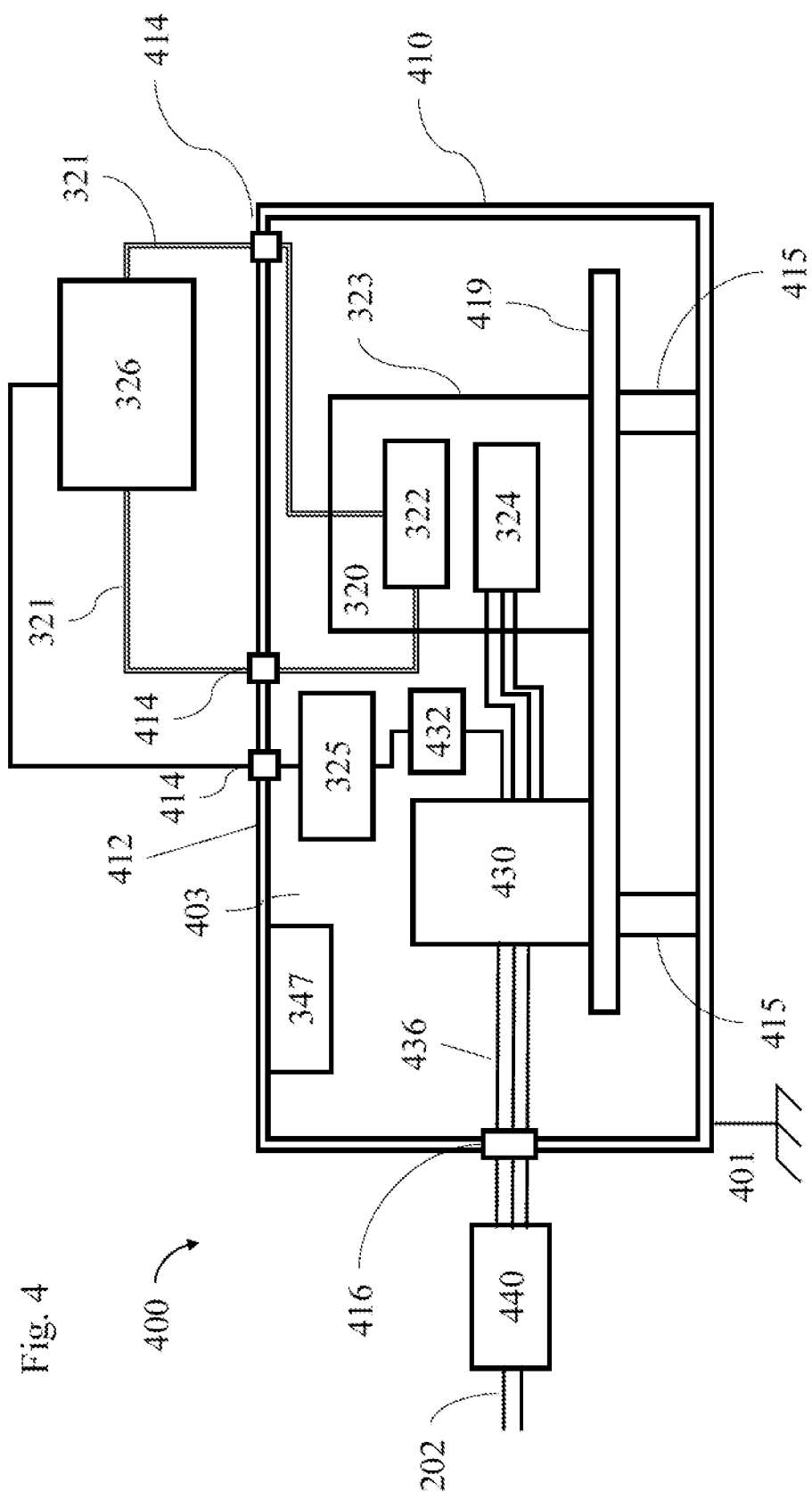
FIG. 4 is a schematic diagram of a vehicle powered transport climate control system including an electrical isolation box, according to another embodiment.

FIG. 4 is a schematic diagram of a portion of a vehicle powered transport climate control system 400 including an electrical isolation box 410, according to another embodiment. It is to be understood that the electrical isolation box 410 may have similar configurations/materials as that of the electrical isolation box 310 of FIG. 3. The transport climate control system 400 is configured to provide climate control within a climate controlled space towed by a vehicle or contained on a chassis. The transport climate control system 400 can include one or more components from, for example, the transport climate control system 5 in FIG. 1A, the transport climate control system 75 in FIG. 1B, and/or the transport climate control system 54 in FIG. 1C. In the depicted embodiment of FIG. 4, the transport climate control system 400 includes one or more climate control circuit components including the compressor 320.

The compressor 320 includes the compressor element 322 driven by an electric motor 324 which is powered by the drive module 330. The compressor element 322 and the electric motor 324 are received in the compressor housing 323. The climate control circuit components of the transport climate control system 300 further incudes the heater 325 and other circuit or system components 326.

A drive module 430 is configured to receive power from a vehicle power network (e.g., the vehicle power network 204 in FIG. 2) to power the compressor 320 and/or other climate control circuit or system components (e.g., the heater 325).

An electrical isolation box 410 is provided to receive the drive module 430, the compressor 320, and the heater 325. The electrical isolation box 410 is further configured to electrically isolate the drive module 430 and the received climate control circuit components 320, 325 at a climate control system electrical potential reference. The climate control system electrical potential reference is different from an electrical potential reference of a vehicle chassis to which the electrical isolation box 410 is connected. For example, in the embodiment depicted in FIG. 4, the electrical isolation box 410 is connected to a chassis ground 401, which refers to the electrical potential reference of the vehicle chassis.

The electrical isolation box 410 includes a wall 412 defining an at least partially enclosed space 403. In an embodiment, the electrical isolation box 410 may include one or more plastic or metal materials at the wall 410. The electrical isolation box 410 may further include a sound dampening material at the wall 412.

The drive module 430, the compressor 320 and the heater 325 are disposed inside the electrical isolation box 410 and are electrically isolated from the electrical isolation box 410. A mounting plate 419 is provided with an electrically non-conductive support 415 inside the electrical isolation box 410 to support and electrically isolate the drive module 430 and the compressor 323 from the electrical isolation box 410. The electrically non-conductive support 415 may include, for example, an insulating fiberglass material, a rubber, etc. In an embodiment, an accelerometer can be connected to the mounting plate 419 to detect a vibration of the compressor 320.

The compressor 320 may be connected to other circuit components 326 disposed outside the electrical isolation box 410 via one or more working fluid tubes/lines 321. The tubes/lines 321 may be made of a non-conductive material. The tubes/lines 321 can be further isolated from the box wall 412 by disposing an electrically non-conductive material at an interface 414 where the working fluid tubes/lines 321 from the compressor 322 pass through the wall 412 of the electrical isolation box 410. The electrically non-conductive material may include, for example, an insulating fiberglass material, a rubber, etc.

The drive module 430 receives power from the power distribution module 240 via the DC bus 202. An electrically non-conductive material is disposed at the interface 414 where the DC bus 202 passes through the wall 412 of the electrical isolation box 410. The electrically non-conductive material may include, for example, rubber. It is to be understood that the interfaces 414, 416 may include any suitable high-voltage connection components including, for example, a header mounted on the wall 312 and a plug connecting to the header, which can be sealed and/or shielded.

In the embodiment depicted in FIG. 4, the drive module 430 includes an isolation transformer to power at least one of the compressor 320 and the heater 325. The isolation transformer is configured to change the voltage level of an input AC power to match the specific voltage requirements of the compressor 320.

A switch 432 can be provided downstream of the isolation transformer 430 to distribute power from the isolation transformer 430 to one of the compressor 320 and the heater 325, for example, when the system switches between different operation modes (e.g., heating and cooling modes).

A DC-to-AC inverter 440 can be provided to connect the isolation transformer 430 to a vehicle power network, e.g., the vehicle power network 204 of FIG. 2. The DC-to-AC inverter 440 is located outside of the electrical isolation box 410 to provide a converted AC power, via AC power lines 436. An electrically non-conductive material is disposed at an interface 416 where the AC power lines 436 pass through the wall 412 of the electrical isolation box 410 to provide electrical isolation. The electrically non-conductive material may include, for example, rubber. It is to be understood that an AC power output from the DC-to-AC inverter 440 may not match the voltage requirements of the compressor 320. The isolation transformer 430 is provide for voltage conversion to allow for computability between the power source (e.g., the inverter 440) and the load (e.g., the compressor 320).

The DC-to-AC inverter 440 may be connected, via the power bus 202, to a power distribution module such as, e.g., the power distribution module 204 of FIG. 2 to receive DC power. The power distribution module is located outside of the electrical isolation box 410 to distribute power from a vehicle power network to the drive module 430. A DC-to-DC converter (not shown) may be electrically connected to the DC-to-AC inverter 440 to buck or boost power from the vehicle power network 204 and be configured to buck or boost power from RESS 206 to obtain the desired load power.

Aspects:

It is to be appreciated that any one of aspects 1-18 and 19-20 can be combined together.

Aspect 1. A transport climate control system configured to provide climate control within a climate controlled space towed by a vehicle, the transport climate control system comprising: one or more climate control circuit components including a compressor;
 a drive module being configured to receive power from a vehicle power network to power the compressor, the vehicle power network including a rechargeable energy storage system (RESS); and
 an electrical isolation box configured to house the drive module and the one or more climate control circuit components, and electrically isolate the drive module and the one or more climate control circuit components at a climate control system electrical potential reference, the climate control system electrical potential reference being different from an electrical potential reference of a vehicle chassis to which the electrical isolation box is connected.

Aspect 2. The transport climate control system of Aspect 1, wherein the electrical isolation box includes one or more walls defining an at least partially enclosed space, the electrical isolation box comprising one or more plastic or metal materials at the one or more walls.

Aspect 3. The transport climate control system of Aspect 2, wherein the electrical isolation box further comprises a sound dampening material at the one or more walls.

Aspect 4. The transport climate control system of any one of Aspects 1-3, wherein the drive module and the one or more climate control circuit components are electrically isolated from the electrical isolation box.

Aspect 5. The transport climate control system of any one of Aspects 1-4, wherein the electrical isolation box further comprises an electrically non-conductive material disposed at an interface where a working fluid tube from the compressor passes through a wall of the electrical isolation box.

Aspect 6. The transport climate control system of any one of Aspects 1-5, wherein the electrical isolation box further comprises an electrically non-conductive material disposed at an interface where an electrical power line from the drive module passes through a wall of the electrical isolation box.

Aspect 7. The transport climate control system of any one of Aspects 1-6, further comprising a mounting plate with an electrically non-conductive material inside the electrical isolation box to support and electrically isolate the drive module and the one or more climate control circuit components from the electrical isolation box.

Aspect 8. The transport climate control system of any one of Aspects 5-7, wherein the electrically non-conductive material comprises rubber.

Aspect 9. The transport climate control system of any one of Aspects 1-8, further comprising an accelerometer attached to the mounting plate to detect a vibration of the compressor.

Aspect 10. The transport climate control system of any one of Aspects 1-9, wherein the drive module is configured to provide a high-voltage power referring to Class B of ISO 6469-3 with a maximum working voltage of between 60 VDC and 1500 VDC or between 30 VAC and 1000 VAC.

Aspect 11. The transport climate control system of any one of Aspects 1-10, wherein the climate control circuit components further include a heater.

Aspect 12. The transport climate control system of Aspect 11, wherein the drive module comprises a DC-to-AC inverter to power at least one of the compressor and the heater.

Aspect 13. The transport climate control system of Aspect 12, wherein the drive module further comprises one or more DC-to-DC converters electrically connected to the DC-to-AC inverter.

Aspect 14. The transport climate control system of Aspect 12 or 13, further comprising a power distribution module connected to the DC-to-AC inverter, the power distribution module being located outside of the electrical isolation box to distribute power from the vehicle power network.

Aspect 15. The transport climate control system of Aspect 11, wherein the drive module comprises an isolation transformer to power at least one of the compressor and the heater.

Aspect 16. The transport climate control system of Aspect 15, further comprising a switch downstream of the isolation transformer to distribute power from the isolation transformer to one of the compressor and the heater.

Aspect 17. The transport climate control system of Aspect 15, further comprising a DC-to-AC inverter connecting the isolation transformer to the vehicle power network, the DC-to-AC inverter being located outside of the electrical isolation box.

Aspect 18. The transport climate control system of any one of Aspects 1-17, further comprising a fan inside the electrical isolation box.

Aspect 19. A method of electrically isolating a hazardous voltage from a vehicle powered transport climate control system used to provide climate control within a climate controlled space towed by a vehicle, the method comprising:

providing, via a drive module, power to one or more climate control circuit components of the vehicle powered transport climate control system, the climate control circuit components including a compressor, the drive module being configured to receive power from a vehicle power network including a rechargeable energy storage system (RESS); and electrically isolating, via an electrical isolation box, the drive module and the one or more climate control circuit components at a climate control system electrical potential reference, the climate control system electrical potential reference being different from an electrical potential reference of a vehicle chassis to which the electrical isolation box is connected.

Aspect 20. The method of Aspect 19, wherein the electrically isolating further comprises positioning the drive module and the one or more climate control circuit components inside the electrical isolation box, and electrically isolating the drive module and the one or more climate control circuit components from the electrical isolation box.

Aspect 21. An electrical isolation box comprising:
one or more walls defining an at least partially enclosed space, the electrical isolation box comprising one or more plastic or metal materials at the one or more walls; and
a mounting mechanism inside the at least partially enclosed space, the mounting mechanism being configured to support one or more climate control circuit components, and electrically isolate the one or more climate control circuit components at a climate control system electrical potential reference, the climate control system electrical potential reference being different from an electrical potential reference of a vehicle chassis to which the electrical isolation box is connected.

Aspect 22. The electrical isolation box of Aspect 21, further comprising one or more entry/exit interfaces at the walls to allow a working fluid tube from the climate control circuit components to pass through, the entry/exit interfaces including an electrically non-conductive material to electrically isolate the working fluid tube from the walls.

Aspect 23. The electrical isolation box of Aspect 21 or 22, further comprising one or more entry/exit interfaces at the walls to allow an electrical power line to pass through, the entry/exit interfaces including an electrically non-conductive material to electrically isolate the electrical power line from the walls.

Aspect 24. The electrical isolation box of Aspect 22 or 23, wherein the electrically non-conductive material comprises rubber.

Aspect 25. The electrical isolation box of any one of Aspects 21-24, further comprising a sound dampening material at the one or more walls.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A transport climate control system configured to provide climate control within a climate controlled space towed by a vehicle or contained on a vehicle chassis, the transport climate control system comprising:
one or more climate control circuit components including a compressor;
a drive module being configured to receive power from a vehicle power network to power the compressor, the vehicle power network including a rechargeable energy storage system (RESS); and
an electrical isolation box configured to house the drive module and the one or more climate control circuit components, and electrically isolate the drive module and the one or more climate control circuit components at a climate control system electrical potential reference, the climate control system electrical potential reference being different from an electrical potential reference of the vehicle chassis to which the electrical isolation box is connected.

2. The transport climate control system of claim 1, wherein the electrical isolation box includes one or more walls defining an at least partially enclosed space, the electrical isolation box comprising one or more plastic or metal materials at the one or more walls.

3. The transport climate control system of claim 1, wherein the drive module and the one or more climate control circuit components are electrically isolated from the electrical isolation box.

4. The transport climate control system of claim 1, wherein the electrical isolation box further comprises an electrically non-conductive material disposed at an interface to allow a working fluid tube from the compressor or an electrical power line from the drive module to pass through a wall of the electrical isolation box.

5. The transport climate control system of claim 1, further comprising a mounting plate with an electrically non-conductive material inside the electrical isolation box to support and electrically isolate the drive module and the one or more climate control circuit components from the electrical isolation box.

6. The transport climate control system of claim 1, wherein the drive module is configured to provide a high-voltage power referring to Class B of ISO 6469-3 with a maximum working voltage of between 60 VDC and 1500 VDC or between 30 VAC and 1000 VAC.

7. The transport climate control system of claim 1, wherein the climate control circuit components further include a heater.

8. The transport climate control system of claim 7, wherein the drive module comprises a DC-to-AC inverter to power at least one of the compressor and the heater.

9. The transport climate control system of claim 8, wherein the drive module further comprises one or more DC-to-DC converters electrically connected to the DC-to-AC inverter.

10. The transport climate control system of claim 8, further comprising a power distribution module connected to the DC-to-AC inverter, the power distribution module being located outside of the electrical isolation box to distribute power from the vehicle power network.

11. The transport climate control system of claim 7, wherein the drive module comprises an isolation transformer to power at least one of the compressor and the heater.

12. The transport climate control system of claim 11, further comprising a switch downstream of the isolation transformer to distribute power from the isolation transformer to one of the compressor and the heater.

13. The transport climate control system of claim 11, further comprising a DC-to-AC inverter connecting the isolation transformer to the vehicle power network, the DC-to-AC inverter being located outside of the electrical isolation box.

14. The transport climate control system of claim 1, further comprising a fan inside the electrical isolation box.

15. A method of electrically isolating a hazardous voltage from a vehicle powered transport climate control system used to provide climate control within a climate controlled space towed by a vehicle or contained on a vehicle chassis, the method comprising:
providing, via a drive module, power to one or more climate control circuit components of the vehicle powered transport climate control system, the climate control circuit components including a compressor, the drive module being configured to receive power from a vehicle power network including a rechargeable energy storage system (RESS); and
electrically isolating, via an electrical isolation box, the drive module and the one or more climate control circuit components at a climate control system electrical potential reference, the climate control system electrical potential reference being different from an electrical potential reference of the vehicle chassis to which the electrical isolation box is connected.

16. The method of claim 15, wherein the electrically isolating further comprises positioning the drive module and the one or more climate control circuit components inside the electrical isolation box, and electrically isolating the drive module and the one or more climate control circuit components from the electrical isolation box.

17. An electrical isolation box comprising:
one or more walls defining an at least partially enclosed space, the electrical isolation box comprising one or more plastic or metal materials at the one or more walls; and
a mounting mechanism inside the at least partially enclosed space, the mounting mechanism being configured to support one or more climate control circuit components, and electrically isolate the one or more climate control circuit components at a climate control system electrical potential reference, the climate control system electrical potential reference being different from an electrical potential reference of a vehicle chassis to which the electrical isolation box is connected, wherein the electrical isolation box is configured to house a drive module, the drive module being configured to receive power from a vehicle power network that includes a rechargeable energy storage source (RESS), and wherein the electrical isolation box is configured to electrically isolate the drive module at the climate control system electrical potential reference.

18. The electrical isolation box of claim 17, further comprising one or more entry/exit interfaces at the walls to allow a working fluid tube from the climate control circuit components to pass through, the entry/exit interfaces including an electrically non-conductive material to electrically isolate the working fluid tube from the walls.

19. The electrical isolation box of claim 17, further comprising one or more entry/exit interfaces at the walls to allow an electrical power line to pass through, the entry/exit interfaces including an electrically non-conductive material to electrically isolate the electrical power line from the walls.

20. The electrical isolation box of claim 17, further comprising a sound dampening material at the one or more walls.

* * * * *